United States Patent
Lopez et al.

(10) Patent No.: US 6,843,290 B2
(45) Date of Patent: Jan. 18, 2005

(54) SURFACE PROFILE OF THE TREAD-PATTERN ELEMENTS OF A TREAD FOR A TIRE

(75) Inventors: Jose Merino Lopez, Riom (FR); Jean-Francois Parmentier, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/208,702

(22) Filed: Jul. 29, 2002

(65) Prior Publication Data

US 2004/0045649 A1 Mar. 11, 2004

(30) Foreign Application Priority Data

Aug. 6, 2001 (FR) ............................................. 01 10526

(51) Int. Cl.$^7$ ................................................ B60C 11/11
(52) U.S. Cl. .................................. 152/209.15; 152/902
(58) Field of Search ............................. 152/209.15, 902

(56) References Cited

U.S. PATENT DOCUMENTS

| | | | | |
|---|---|---|---|---|
| 5,503,208 A | * | 4/1996 | Kamegawa et al. ... | 152/209.15 |
| 5,690,761 A | * | 11/1997 | Masaoka ................... | 152/902 |
| 5,896,905 A | | 4/1999 | Lurois ................... | 152/209.23 |
| 6,431,234 B1 | * | 8/2002 | Gast et al. ............. | 152/209.15 |
| 2002/0166615 A1 | * | 11/2002 | Gerresheim et al. ... | 152/209.18 |

FOREIGN PATENT DOCUMENTS

| | | | |
|---|---|---|---|
| EP | 1020306 | | 7/2000 |
| EP | 1074405 | * | 2/2001 |
| GB | 1549347 | * | 8/1979 |
| JP | 6-166304 | * | 6/1994 |
| WO | WO 93/21028 | * | 10/1993 |

OTHER PUBLICATIONS

Patent Abstract of Japan, Publication No. 03 038410, May 2, 1991, and JP 03 038410, Feb. 19, 1991.

* cited by examiner

Primary Examiner—Steven D. Maki
(74) Attorney, Agent, or Firm—Burns, Doane, Swecker & Mathis, L.L.P.

(57) ABSTRACT

A tire comprising a tread having a tread pattern having a preferred running direction R. The tread pattern is formed by a plurality of blocks arranged in at least three rows of generally circumferential orientation, the axially outermost rows defining the edges of the tread enclosing at least one intermediate row of blocks. Each block has a block length L and a contact face delimiting, with the continuations of the lateral faces of the block, a complementary volume V with a virtual cylinder C, C' enveloping the block. The center of gravity G of the volume V is situated at a distance $D_G$ from the mid-plane M, M' of the block dividing the block into two substantially equal volumes. The tire is characterized in that:

for each of the blocks of the edges of the tread, the distance $D_G$ is not zero and negative and less, in terms of absolute value, than a third of the length L;

for each of the blocks of the intermediate rows, the distance $D_G$ is not zero and positive and less, in terms of absolute value, than a third of the length L, it being understood, by convention, that a distance $D_G$ is positive when the center of gravity G is in front of the mid-plane M, M' of the block in question.

7 Claims, 2 Drawing Sheets

SURFACE PROFILE OF THE TREAD-PATTERN ELEMENTS OF A TREAD FOR A TIRE

BACKGROUND OF THE INVENTION

1. Technical Field of the Invention

The invention relates to the tread patterns of treads for tires intended to equip heavy vehicles and, more particularly, to the geometry of the contact surfaces with the road of the raised elements forming the tread pattern of the treads.

2. The Related Art

In order to obtain satisfactory grip performance on wet roads, it is known to provide the tread of a tire with a tread pattern formed by a plurality of grooves delimiting raised features having the form of ribs or the form of blocks. In addition, it is also possible to provide a plurality of raised elements thus formed with at least one slit in the form of a groove of small width (called an incision), or even of zero width (called a sipe) so as to create a large number of edges for cutting the layer of water covering the wet road.

In the case of tires intended to equip a driving axle of a heavy vehicle (to which axle are transmitted driving torques and braking torques), it is known to provide the treads of the tires with tread patterns formed of a plurality of blocks delimited by grooves of generally transverse and circumferential orientation. Each block of the tread pattern has a so-called leading face and a trailing face, each of which faces intersects the contact face of the block to form an edge (leading edge and trailing edge, respectively). The leading edge corresponds to a line of points of the contact face coming first as the tire contacts the road.

In view of the existence of sliding movements of low amplitude between the tread of a tire and the road when a vehicle equipped with such a tire is running, progressive and regular wear of the tread-pattern elements occurs. It has been found that this so-called "regular," wear may be superimposed with wear which is said to be "irregular" since it is more pronounced in certain regions of the raised elements forming the tread pattern of the tread and/or on some of these elements.

This irregular wear is the result of a combination of the running mechanisms and the driving and braking forces applied intermittently to the tires (corresponding respectively to the acceleration and braking phases of the vehicle, running on roads with a slope of greater or lesser steepness). In this case, more pronounced wear of the blocks develops in the vicinity of the trailing and/or leading edges as compared to the wear found on the rest of the surface of the block (irregular wear known as "sawtooth" wear). The aforementioned running conditions lead to irregularities in the distribution of the forces exerted by the road on the contact surface of each element between the leading edge and the trailing edge.

It has additionally been found that arrangements which make it possible to improve the average rate of wear of a tire lead to irregular wear which is more marked in particular on the tread-pattern elements situated at the shoulders of the tire (that is to say close to the lateral edges of the tread). Conversely, the arrangements which make it possible to avoid irregular wear lead to an increase in the average rate of wear.

For example, the applicant's U.S. Pat. No. 5,896,905 discloses, in order to reduce the irregular wear on the tread-pattern elements of a tire tread for heavy vehicles, the formation of a heightening of the trailing edges relative to the leading edges, in combination with an inclination of the incisions. Although this results in a reduction of the irregular wear, there is an increase of the overall average wear.

SUMMARY OF THE INVENTION

The principle underlying the present invention is based on a tire of the heavy vehicle type, comprising a tread provided with a tread pattern formed of a plurality of raised elements delimited by longitudinal or circumferential grooves and transverse grooves and arranged in circumferential rows, and on which there can be distinguished the elements situated axially on the edges of the tread and forming the shoulders of the tire and the other elements situated axially between the edges in intermediate rows.

The object of the invention is to provide a tread for a tire intended for the driving axles of heavy vehicles, the average rate of wear of which is maintained while avoiding the occurrence of irregular wear on some of the tread-pattern elements, without causing considerable additional industrial cost.

To this end, the tire according to the invention comprises a tread having a tread pattern defined by a plurality of grooves of generally circumferential orientation and by a plurality of grooves of generally transverse orientation, which grooves delimit a plurality of rubber blocks arranged in at least three rows of generally circumferential orientation. The axially outermost rows define the edges of the tread and enclose at least one intermediate row of blocks, each block being delimited by a contact face, front and rear faces and lateral faces in the axial direction. The contact face corresponds to the part of the block in contact with the ground under normal pressure and load use conditions. This contact face is delimited by front and rear contact lines, the front contact line being the location of the points of the contact face which are the first to come into contact with the ground and the rear contact line being the location of the points of the contact face which are the last to be in contact with the ground. The front face and the rear face of each block intersect the contact face along the front line and the rear line, respectively.

For each block, there is defined a length L in the longitudinal direction of the tread as being the maximum distance separating points of the front line from points of the rear line of the block, these points being taken in pairs in the same longitudinal section plane.

For each block, there is defined a complementary volume V between the contact face and the surface of an enveloping virtual cylinder having an axis coinciding with the axis of rotation of the tire equipped with the tread, the virtual cylinder being tangent to the contact face. The complementary volume V is further delimited by the continuations of the front and rear faces and those of the lateral faces.

Furthermore, the center of gravity of each complementary volume V is denoted G and the distance of the center of gravity G to the mid-plane of the block is denoted $D_G$. By mid-plane of the block, there is to be understood a plane containing the axis of rotation of the tire when a tire is equipped with the tread, which plane divides the block into two parts having substantially the same volume. Depending on whether the point G is in front of the mid-plane or behind the plane, the distance $D_G$ is respectively positive or negative. A point is in front of a mid-plane when the mid-plane has to be rotated towards the point in the direction of rotation of the tire.

The tire according to the invention is characterized in that:

for each of the blocks of the edges of the tread, the distance $D_G$ is not zero and negative, its absolute value being less than a third of the length L;

for each of the blocks of the intermediate and center rows, the distance $D_G$ is not zero and positive, its absolute value being less than a third of the length L.

A contact face of a block of a tread with which a tire is equipped is enveloped by a virtual enveloping cylinder surface when the latter has at least a series of points common with the contact face, all the other points of the contact face being situated on the same side relative to the virtual surface. In certain cases, it is possible to have a continuous surface or one which is non-continuous, that is to say, formed of at least two disjointed surfaces. In other cases, the common surface may be reduced to a line or even a point.

Seen in section in a plane perpendicular to the axis of rotation of the tire, the profile of the contact face of the tread-pattern blocks may be adapted, consequently, to satisfy the relationships stated above.

Preferably, the absolute value of the distance $D_G$ of each of the blocks is between L/5 and L/7.

If the distance of the center of gravity G of the complementary volume V of any block of the tread measured relative to the virtual enveloping cylinder surface of the said block is denoted $H_G$, then it is preferable that for all the blocks of the tread pattern the following relationship is satisfied:

$$0.1 \text{ mm} < H_G < 1 \text{ mm}$$

in order to create an overturning moment of each block which is suitable for obtaining the desired effect in respect of the wear on the entire tread.

Preferably, the complementary volume V is at most equal to 75% of a volume V* constructed on the same faces as those limiting the volume V except that the contact face is replaced by a fictitious surface parallel to the enveloping surface and passing through the innermost point of the contact face relative to the block, that is to say relative to the point farthest from the enveloping surface. It has been found that as soon as the complementary volume V is greater than 75% of the volume V* and, therefore, gets closer to V, everything happens as if the desired effect were partly annihilated (these cases correspond to the presence of a very localized variation of the geometry of the surface).

BRIEF DESCRIPTION OF THE DRAWINGS

Other features and advantages of the invention emerge from the description given below with reference to the appended drawings which show, by way of non-limiting examples, embodiments of the subject matter of the invention, and in which.

DETAILED DESCRIPTION OF EXEMPLARY EMBODIMENTS

Figure 1:
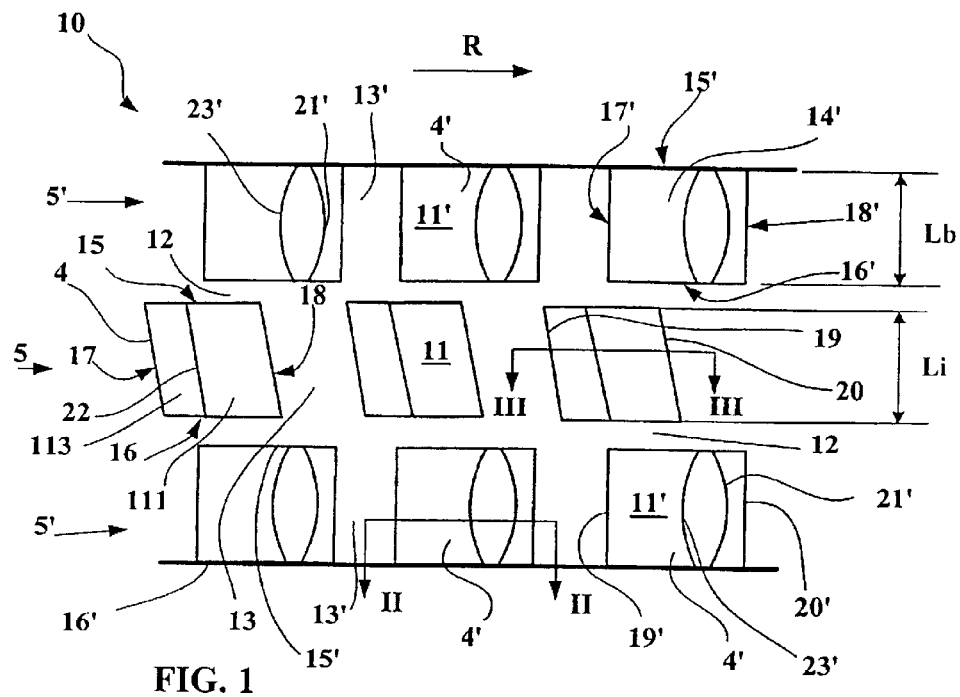
FIG. 1 is a partial plan view of a tread pattern of a tire according to the invention having three rows of blocks.

FIG. 1 shows in plan the outer surface of a tread 10 of a tire intended to be mounted on a front axle of a heavy vehicle. The tread 10 is provided with a tread pattern comprising two grooves 12 of circumferential orientation and a plurality of grooves 13 and 13' of transverse or axial orientation, these grooves 12, 13 and 13' delimiting a plurality of tread-pattern blocks 4, 4'. The blocks 4 are substantially arranged in a center or intermediate row 5, whereas the blocks 4' are substantially arranged in two edge rows 5'. Although one intermediate row 5 is shown in FIG. 1, more than one row may be provided, if desired.

More precisely, the blocks 4 of the central row 5 have a contact face 11 intended to come into contact with the road when the tire provided with the tread is running. The direction marked by the arrow R in FIG. 1 indicates the preferred running direction of the described tread. See FIGS. 1 and 3. The blocks 4 have here a length L measured in a longitudinal plane between the farthest points of the trailing and leading edges.

The same blocks 4 have four lateral faces 15, 16, 17, 18, two of which, the faces 17 and 18, intersect the contact face 11 along a rear line 19 and a front line 20, respectively. These front and rear lines correspond to the front and rear limits of the contact area between the contact face and the road when the tire is subjected to normal pressure and load conditions while running. They correspond to what is usually denoted by trailing edge and leading edge, respectively.

The contact face 11 of each block 4 is formed of two surface parts 111 and 113, which intersect along an edge 22. The edge 22 is the location of the points of tangency of the contact face 11 with a virtual cylinder C having the same axis as the axis of rotation of the tire. The virtual cylinder envelopes the blocks 4 of the central row 5. In the case presented, the edge 22 is substantially rectilinear and oblique relative to the transverse direction of the tread.

Figure 3:
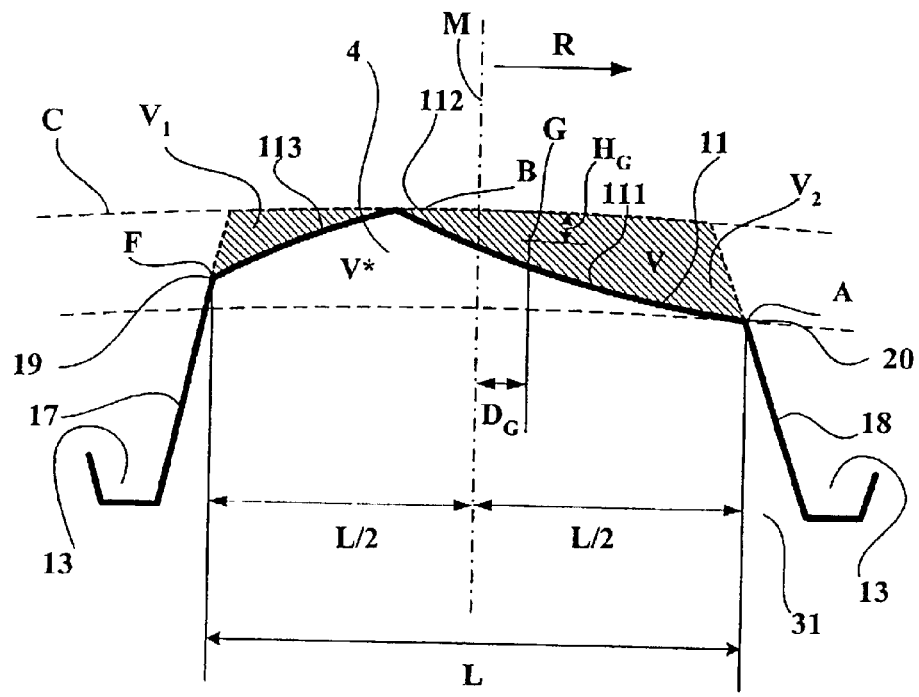
FIG. 3 is a view in section along the line III—III of one block of an intermediate row of the tread pattern shown in FIG. 1.

FIG. 3 shows a cross-section of one block 4 of the central row of FIG. 1 along the section line III—III. The points of intersection of the front and rear lines of the contact face with this section plane are marked A, F, respectively, and the point of intersection of the edge 22 with this same section plane is marked B. In FIG. 3, the volume V is composed of two volumes, a front volume $V_2$ and a rear volume $V_1$, the front volume $V_2$ being greater than the rear volume $V_1$.

The center of gravity G of the complementary volume V is situated within the front volume $V_2$ at a distance $D_G$ from a mid-plane M dividing the block 4 substantially into two equal volumes (corresponding here to dividing the length L of the block into two equal lengths). The center of gravity G is situated in front of the mid-plane M, that is to say, it is in front of the plane M in the direction of rotation R. In the present case, the distance $D_G$ is positive and substantially equal to L/9.

Moreover, the center of gravity G is situated at a distance HG from the cylinder surface C of preferably between 0.1 mm and 1 mm.

The offset position of the center of gravity G causes, each time the contact face of a block 4 goes past in contact, an overturning moment acting on the block.

The volume V is preferably between 25% and 75% of the volume V* obtained as the volume limited by the same faces and surfaces as the volume V, with the exception of the contact face which is replaced by a cylinder surface parallel to the surface C enveloping the block and passing through the innermost point of the contact face (in the present case this point corresponds to the point A).

In combination with the arrangement described for the blocks of the central rows, the blocks 4' of each edge row 5' have a contact face 11', the geometry of which is such that an overturning moment is formed as it goes past in contact, the overturning moment being of opposite sign to that acting on the blocks 4 of the central rows. See FIGS. 1 and 2.

The blocks 4' have four lateral faces 15', 16', 17', 18', two of which, the faces 17' and 18', intersect the contact face 11' along a rear line 19' and a front line 20', respectively. These front and rear lines correspond to the front and rear limits of the contact area between the contact face and the road when the tire is subjected to normal pressure and load conditions while running. They correspond to what is denoted by trailing edge and leading edge of the block 4', respectively.

The contact face 11' of each block 4' is formed of three surfaces 111', 112' and 113', such surfaces intersecting in pairs along edges 21' and 23'. The surface 112' is the location of the points of the contact face 11' which are common with a virtual cylinder C' having the same axis as the axis of rotation of the tire, which virtual cylinder C' envelopes the blocks 4' of the edge rows.

In the case presented, the edges 21' and 23' are curvilinear and both intersect the lateral faces 15' and 16' of the block.

Figure 2:
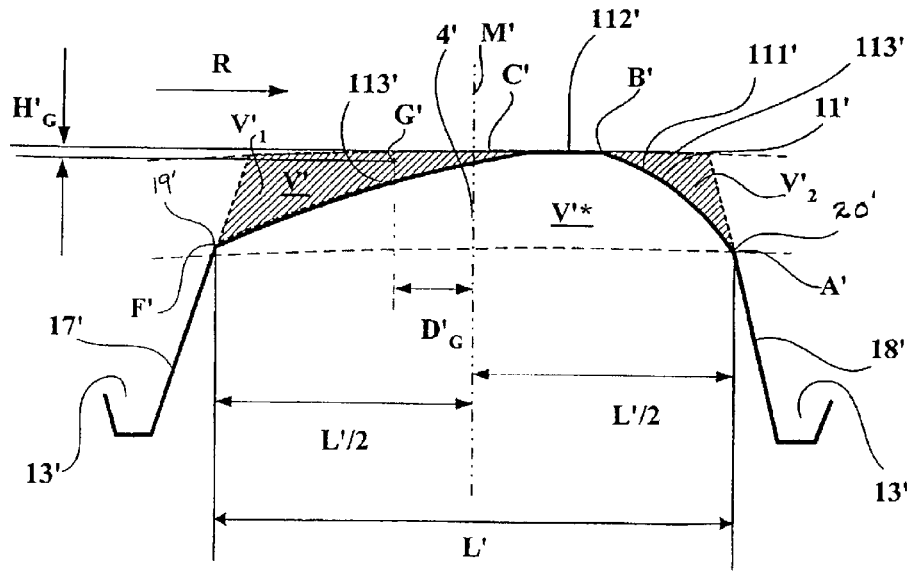
FIG. 2 is a view in section along the line II—II of one block of an edge row of the tread pattern shown in FIG. 1.

FIG. 2 shows a cross-section of one block 4' of an edge row of FIG. 1 along the section line II—II. The points of intersection of the front and rear lines of the contact face with this section plane are marked A', F', respectively, and the points of intersection of the edges 21' and 23' with this same section plane are marked B', C', respectively. Shown in FIG. 2 are two hatched regions corresponding to the intersections of a front volume V'$_2$ and a rear volume V'$_1$ of the block 4', the two volumes together forming a complementary volume V'.

The complementary volume V' on the block 4' is defined as the total volume delimited by the continuation of the rear and front faces 17', 18', the contact surface 111', the virtual cylinder surface C' enveloping the block 4' and of axis parallel to the axis of rotation of the tire and by the continuations of the lateral faces of the block 4', namely the faces 15' and 16'. The rear volume V'$_1$, is defined as the volume of material delimited by the continuation of the rear face 17', the contact surface 113', the virtual cylinder surface C' and the continuations of the lateral faces of the block 4'. The front volume V'$_2$ is defined as the volume of material delimited by the continuation of the front face 18', the contact surface 111', the virtual cylinder surface C' and the continuations of the lateral faces of the block 4'.

For the blocks 4' of the edge rows, the rear volume V'$_2$ is greater than the front volume V'$_2$.

The center of gravity G' of the complementary volume V' is situated within the rear volume V'$_1$ at a distance D'$_G$ from the mid-plane M' dividing the block 4' substantially into two equal volumes (corresponding here to dividing the length L' of the block into substantially two equal lengths). The center of gravity G' is situated behind the mid-plane M', that is to say, it is behind the plane M' relative to the direction of rotation R. In the present case, the distance D'$_G$ is negative and substantially equal to L/6.

The offset position of the center of gravity G' relative to the mid-plane M' causes, each time the contact face of a block 4 goes past in contact, an overturning moment acting on the said block.

The volume V' is preferably between 25% and 75% of the volume V'* obtained as the volume limited by the same faces and surfaces as the volume V', with the exception of the contact face which is replaced by a cylinder surface parallel to the surface C' enveloping the block and passing through the innermost point of the contact face (in the present case this point corresponds to the point A').

The combination of the features of the blocks of the central row(s) and the blocks of the edge rows of a tread having a predetermined running direction gives this tread results in terms of regular wear and irregular wear that are markedly superior to what was known before the present invention.

Figure 4:
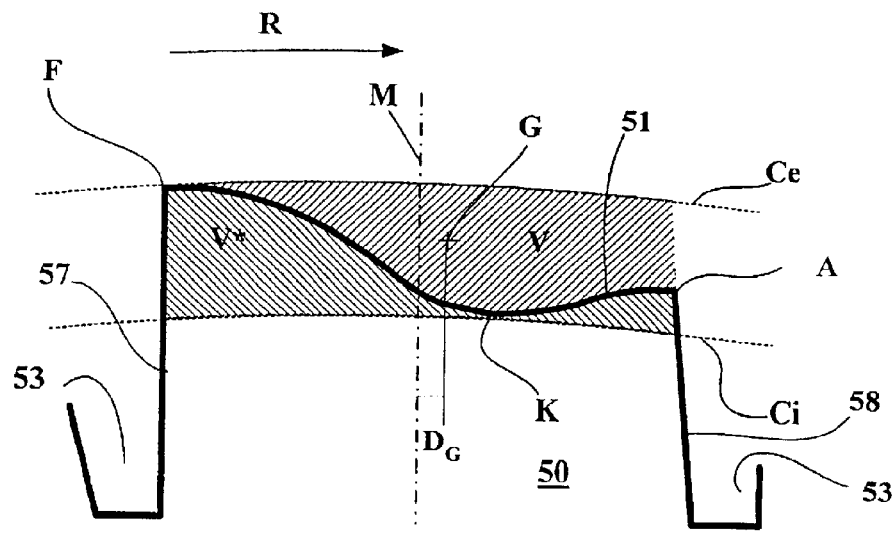
FIG. 4 is a circumferential sectional view of a variant profile of a block according to the invention.

The front and rear lateral faces may advantageously have relief angles, as shown with the version of FIGS. 1–3, or not, as is the case with another version of the block shown in FIG. 4.

FIG. 4 shows, in section in a plane perpendicular to the axis of rotation of the tire, the profile of a block 50 according to the invention. In this particular case, the profile is identical whatever the position of the section plane on the block. The block 50 comprises a contact face 51 which intersect front and rear faces 58, 57 along edges, the intersections of which with the section plane of the figure correspond to the points A and F, respectively. In addition, the path of the contact face in this figure passes through a point K which is situated, relative to the bottom of the grooves 53 delimiting the block, at a lower height than the heights of the points A and F. The block 50 is also limited by lateral faces, not visible in FIG. 4.

A virtual cylinder surface Ce envelops the block 50 while passing through the point F and delimits a complementary volume V with the continuation of the face 58, the contact face 51 and the continuations of the lateral faces. Preferably, the volume V is between 25% and 75% of a volume V* obtained as the volume limited by the same faces and surfaces, with the exception of the contact face which is replaced by a cylinder surface Ci parallel to the surface Ce and passing through the innermost point K of the contact face of the block.

The block 50 may be a block either of a central row or of an edge row of a tread, depending on whether the center of gravity G of the complementary volume V is located in front of or behind the mid-plane M of the block with respect to the chosen direction of rotation (in the case shown, the point G is in front of the plane with respect to the direction of rotation R).

In another version according to the invention, not shown in the drawings, each block of a tread pattern of a tread has a contact face of generally plane shape inclined by a mean angle relative to a plane surface tangent to a cylinder passing through the leading or trailing edge of the block. The inclination of the contact face of any block is determined as a function of the position of the block. For a block of the edge of the tread, the leading edge is radially farther away from the axis of rotation of the tire than the trailing edge, whereas for a block of the intermediate rows, it is the opposite. The difference in radial height between the leading-line points and the trailing-line points is preferably between 0.3 mm and 3 mm. The value chosen for the angle of inclination of the contact faces may be the same for all the blocks or, alternatively, angles having different values may be chosen.

What has been described here applies to any type of tread whether it is formed on the tire during manufacture of the tire or whether it is formed separately from the tire in the form of a closed ring.

What is claimed is:

1. A tire comprising a tread having a tread pattern having a preferred rotation direction R, said tread pattern being defined by a plurality of grooves of generally circumferential orientation and by a plurality of grooves of generally transverse orientation, said grooves delimiting a plurality of blocks arranged in at least three rows of generally circumferential orientation, the axially outermost rows defining the edges of the tread enclosing at least one intermediate row of blocks, each block being delimited by a contact face, front and rear faces and lateral faces, the front and rear faces intersecting the contact face along front and rear contact lines, respectively, there being defined for each block:

a block length L in the longitudinal direction of the tread as being the maximum distance separating points of the front contact line from the rear contact line of said block, said points being taken in pairs in the same longitudinal section plane;

a complementary volume V between the contact face and the enveloping surface of a virtual cylinder C, C' having an axis coincident with the axis of rotation of the tire equipped with the tread, said virtual cylinder being tangent to said contact face, the complementary volume V being further delimited by at least one of a continuation of the front face and a continuation of the rear face, and by respective continuations of the lateral faces;

a center of gravity G of the complementary volume V, said center being situated at a distance $D_G$ from the mid-plane M, M' of the block, said plane M, M' dividing said block into two substantially equal volumes;

wherein a profile of the contact face, as viewed in a sectional plane extending through the row of blocks perpendicularly to the rotation axis passes through a point situated at a height which, relative to a bottom of the grooves, is lower than respective heights where the front and rear contact lines intersect the sectional plane, and wherein:

for each of the blocks of the edges of the tread, the distance $D_G$ is not zero and negative and less, in terms of absolute value, than a third of the length L; and for each of the blocks of the intermediate rows, the distance $D_G$ is not zero and positive and less, in terms of absolute value, than a third of the length L, wherein, by convention, the distance $D_G$ is positive when the center of gravity G is in front of the mid-plane M, M' of the block in question, such that the direction of the displacement which causes the mid-plane M, M' to pass the point of the center of gravity G is identical to the preferred direction of rotation R of the tire.

2. The tire according to claim 1, wherein the distance $H_G$ of the center of gravity G of the complementary volume of each block of the tread measured relative to the virtual enveloping cylinder surface of said block is such that:

$$0.1 \text{ mm} < H_G < 1 \text{ mm}.$$

3. The tire according to claim 1, wherein the complementary volume V of each block is at most equal to 75% of the volume V* constructed on the same faces as those limiting said volume V, except that the contact face is replaced by a fictitious face parallel to the enveloping surface C, C' and passing through the front or rear contact line farthest from the enveloping surface C, C' of the block.

4. The tire according to claim 3, wherein the complementary volume V of each block is at least equal to 25% and at most equal to 75% of the volume V*.

5. The tire according to claim 2, wherein the complementary volume V of each block is at most equal to 75% of the volume V* constructed on the same faces as those limiting said volume V except that the contact face is replaced by a fictitious face parallel to the enveloping surface C, C' and passing through the front or rear contact line farthest from the enveloping surface C, C' of the block.

6. The tire according to claim 6, wherein the complementary volume V of each block is at least equal to 25% and at most equal to 75% of the volume V*.

7. The tire according to one of claims 1 to 4, wherein the absolute value of the distance $D_G$ of each of the blocks is between L/5 and L/7.

* * * * *